United States Patent Office 3,141,807
Patented July 21, 1964

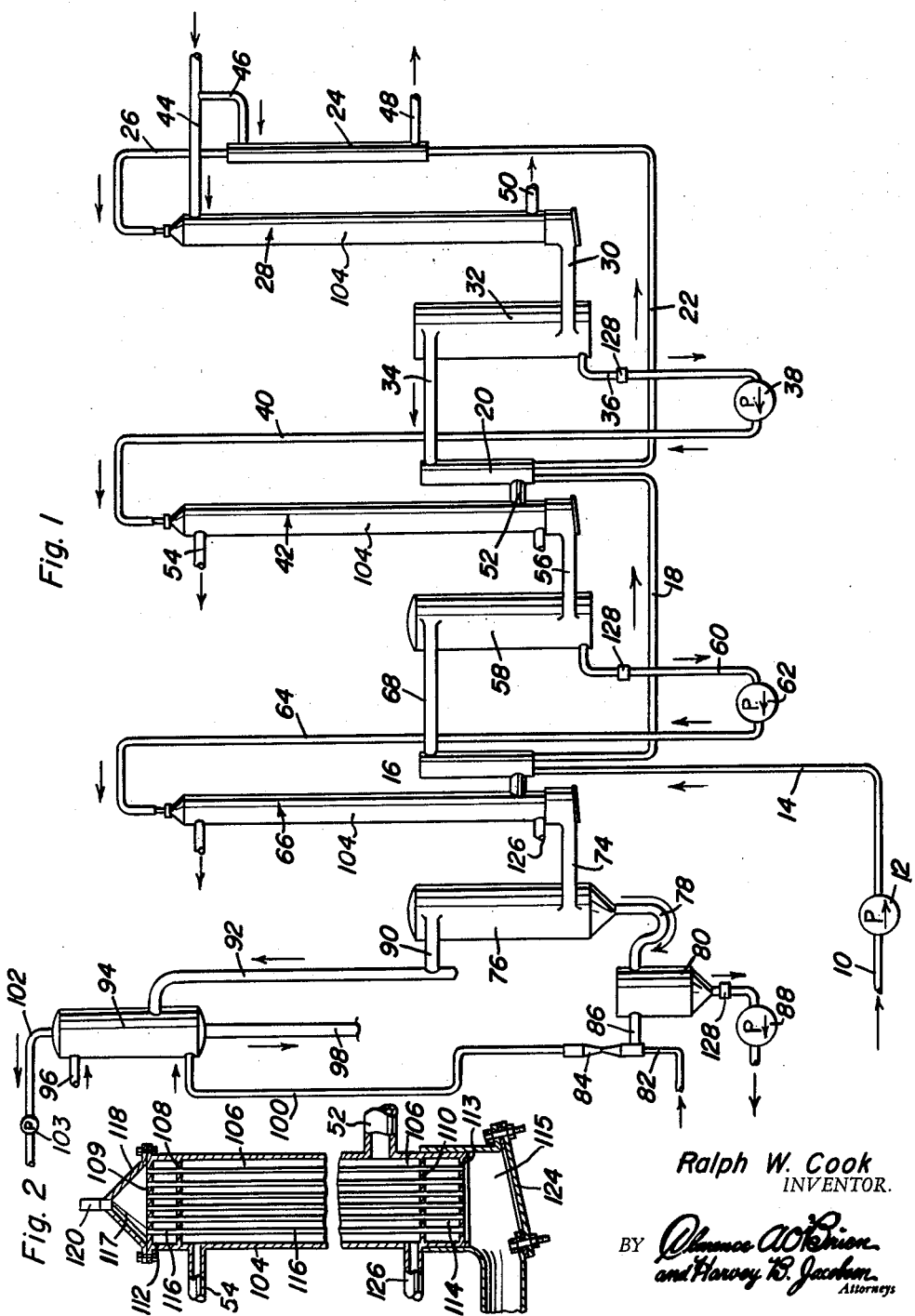

3,141,807
VACUUM EVAPORATOR
Ralph W. Cook, 311 Main St., Dunedin, Fla.
Filed Nov. 30, 1960, Ser. No. 72,709
3 Claims. (Cl. 159—17)

This invention relates to equipment and a process for concentrating of food liquids such as fruit juices by partial evaporation thereof to a desired extent under vacuum.

Although the process and apparatus of this invention is especially useful for the partial evaporation of heat sensitive liquid such as orange juice for concentration purposes, it is also generally useful inasmuch as the evaporation system of this invention accomplishes the objective thereof in a more efficient and economical manner than was heretofore thought possible. In general, heat sensitive liquids such as orange juice are concentrated by evaporation thereof to a desired extent by a process involving several stages of preheaters, evaporators and separators. The arrangement of the equipment and the design of some of the components thereof pursuant to this invention is such as to move the feed liquid and resulting vapors through the process at high velocity so as to secure high heat transfer rates and short retention times for the fluid moving through the equipment and to also reduce or prevent scaling and burning of the feed liquid onto the surfaces of the equipment or heat damage to the liquid which is an important object of this invention.

A further object of this invention is to provide a multistage process for obtaining the desired liquid concentrate from a feed liquid characterized by forced feed vacuum operation by employing transfer pumps for withdrawing concentrated liquid from one stage and feeding it to a following stage for further concentration thereof. Suction pressure is applied to the finally concentrated liquid leaving the final stage as well as to the finally released vapor which is drawn into a condenser cooperating with a flash cooler for cooling the finally concentrated liquid.

The process of this invention therefore involves force feeding feed liquid through an initial preheater, further preheating the feed liquid by intermediate preheaters and finally preheating the liquid by heat externally derived. The preheated feed liquid is then supplied to an initial stage evaporator heated by said externally derived source whereupon the feed liquid is partially evaporated under vacuum into a vapor and liquid mixture. An initial stage separator then separates the mixture into concentrated liquid and vapor. The initially concentrated liquid is then fed by a transfer pump to a second stage evaporator while the vapor is transferred through one of the intermediate preheaters for purposes of preheating the feed liquid passing therethrough. The vapor leaving the preheater then passes to the intermediate stage evaporator to which the initially concentrated liquid is fed so that the initially concentrated liquid may be further partially evaporated into a liquid and vapor mixture. An intermediate stage separator then separates out from the mixture a further concentrated liquid and delivers additional vapor under vacuum another stage preheater and following stage evaporator. The final stage separator then delivers the finally concentrated liquid to a flash cooler operating by suction produced by a steam jet from which cooler the concentrated liquid is fed by means of a product pump. The finally released vapor is condensed in a condenser to which the steam jet is connected. As a result of the foregoing arrangement, high velocity and high temperature operation is made possible so as to provide the advantages hereinbefore indicated. Also, the evaporator equipment involves a particular arrangement between the inlet and the heat transfer tubes thereof which assures that the end portions of the heat transfer tubes are continually rinsed with the feed liquid preventing accumulations thereon. The heat transfer tube ends are further insulated from the heating chamber of the evaporator to further prevent sticking or burning of material on the tube ends.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a schematic illustration of the apparatus for practicing the process of this invention.

FIGURE 2 is a partial sectional view of one evaporator stage.

Referring now to the drawings in detail, FIGURE 1 illustrates the arrangement of the apparatus for practicing the process of this invention with the arrows indicating the direction of flow of fluid through the system. It will therefore be observed that a feed pump 12 which receives feed liquid from some supply through conduit 10 discharges the feed liquid under pressure into conduit 14 for delivery to an initial preheater 16 through which the feed liquid passes and is delivered by conduit 18 to an intermediate stage preheater 20. The intermediate stage preheater 20 delivers the feed liquid to a conduit 22 which is connected to final stage preheater 24 through which the feed liquid passes. Conduit 26 therefore delivers the finally preheated feed liquid to an initial evaporator stage 28. The feed liquid is thereby partially evaporated into a liquid and vapor mixture under vacuum pressure delivered by outlet conduit 30 to an initial stage separator 32 to which the outlet conduit 30 is tangentially connected adjacent the bottom. Tangentially connected adjacent the top of the separator 32 is a vapor outlet conduit 34 which is connected to the intermediate stage preheater 20 for supplying the vapor thereto for purposes of preheating the feed liquid passing therethrough by heat transfer between the vapor and the feed liquid. The initial stage separator 32 also delivers the concentrated liquid to an outlet conduit 36 connected to a transfer pump 38 whereby it is discharged under pressure sufficient to raise it to the top of the next stage evaporator. The transfer pump therefore withdraws the initially concentrated liquid from the initial stage separator 32 and delivers it through conduit 40 to an intermediate stage evaporator.

At this point it should be appreciated that the construction of the evaporator of the initial stage 28 and intermediate stage 42 are similar. The initial stage evaporator however will necessarily operate under higher temperatures. The source of heat by means of which both the final preheater 24 and the initial stage evaporator are operative to finally preheat and evaporate respectively the liquid, differs from that of the other preheater and evaporators. Accordingly, a steam inlet conduit 44 is provided for supplying steam or for that matter any externally heated fluid to the evaporator 28 adjacent the upper end thereof and also by a conduit 46 supplies the final preheater 24. A condensate outlet 48 is provided for the final preheater 24, while a condensate vent outlet 50 is provided for the evaporator of stage 28. The intermediate stage evaporator on the other hand receives its source of heat by the vapor circulated through the intermediate stage preheater 20 conducted through the connecting passage 52. The heating vapor enters the intermediate stage evaporator adjacent the bottom thereof and the non-condensible portions of the vapor passing through the intermediate stage evaporator are discharged out the vent outlet 54 to some vapor removal apparatus. Condensate is discharged from outlet 126, as seen in FIGURE 2. The intermediate stage evaporator therefore delivers through outlet conduit 56 its mixture of liquid and vapor resulting from the further evaporation of the initially concentrated liquid supplied thereto by conduit 40. The vapor liquid mixture therefore is tangentially supplied by conduit 56 to the bottom portion of an intermediate stage separator 58. Further concentrated liquid therefore leaves the second stage separator 58 by a conduit 60 by being withdrawn under suction pressure of transfer pump 62. The further concentrated liquid is then fed through conduit 64 through a final evaporator stage 66 similar in construction to the intermediate stage. The additional vapor released by the second stage separator 58 is on the other hand delivered by tangentially connected outlet vapor conduit 68 to the initial stage preheater 16 for initially preheating the feed liquid passing therethrough. Accordingly, the vapor circulated through the initial preheater 16 is delivered to the final stage evaporator by the connecting conduit for final evaporation of the concentrated liquid passing therethrough. A vent outlet is therefore also provided for the non-condensible portion of the heating vapor passing upwardly through the final stage evaporator similar to vent outlet 54 while condensate is discharged from outlet 126. The outlet conduit 74 therefore similarly delivers a vapor liquid mixture to the final stage separator 76.

Finally concentrated liquid will be withdrawn from the final stage separator 76 by a conduit 78 and delivered to a flash cooling chamber 80. The flash cooling chamber 80 is operated in a manner well known to those skilled in the art, by means of high velocity high pressure steam entering conduit 82 and passing through a Venturi device 84 which is connected to the flash cooling chamber 80 by means of passage 86. The finally concentrated liquid is thereby cooled within the flash cooling chamber 80 and withdrawn therefrom by a product pump 88 at a reduced temperature.

The final released vapor from the final stage separator 76 is delivered by outlet vapor conduit 90 to a delivery conduit 92 to a condenser 94. The condenser 94 therefore receives cooling medium by an inlet conduit 96 for circulation and discharge through outlet conduit 98. The steam jet produced by the device 84 may therefore discharge into the condenser 94 by a conduit 100 while the suction conduit 102 is connected to the top of the condenser 94 for removal of non-condensibles therefrom under vacuum by pump 103.

Referring now to FIGURE 2 in particular, it will be observed that the evaporators of each of the stages 28, 42 and 66 consist of a vertically disposed cylindrical tank 104. The heating chamber 106 is enclosed within the walls of the tank 104 between an upper end plate 108 and a lower end plate 110. Preferably, a conical inlet chamber 117 defined by a removable conical head member 118 is formed above the upper end of the chamber 106 and insulated therefrom by a space insulating chamber 112 formed between plates 109 and 108 while a fluid insulating chamber 114 is disposed beneath the chamber 106 and is formed between plates 110 and 113. The foregoing arrangement is sufficient to provide a heat transfer barrier for loss of heat from the flowing fluid. A plurality of evaporating heat transfer ducts 116 are therefore mounted in parallel spaced relation to each other between the upper and lower ends thereof in communication with the inlet and outlet chambers 117 and for conducting a downwardly flowing vapor-liquid mixture 115. The inlet chamber 117 is conically shaped for confining a liquid inlet spray delivered to the inlet chamber by means of nozzles 120. Alternatively, the conical inlet chamber may be replaced by an inlet chamber with a removable lid, as illustrated and described in my copending application Serial No. 72,710, filed November 30, 1960, now abandoned.

The outlet end of the evaporator disposed at the bottom thereof includes a removable bottom 124 in communication with the outlet 115 which is connected to the outlet conduit through which the liquid and vapor mixture passes. It will therefore also be observed that connected to the heating chamber 106 adjacent the bottom thereof is the heating vapor inlet 52 or 70. Also adjacent the top end of the heating chamber 106 is the non-condensible vent outlet 54 or 72. Also provided adjacent the bottom of the heating chamber is a condensate outlet 126. It will therefore be apparent from the foregoing description of the evaporator structure that the fluid enters through nozzle 120 at a higher temperature than in chamber 117 and will therefore be converted into a vapor-liquid mixture entering the tubes 116 at a high velocity while the major evaporation and/or concentration occurs as the mixture flows through the tubes. The insulation for the inlet end provided by the chamber 112 is therefore necessary in connection with the cleaning action of the high velocity fluid mixture to prevent scaling and/or burning at the inlet ends of the tubes 116 as explained in my aforementioned application.

From the foregoing description, operation and utility of the process and apparatus of this invention will be apparent. In summary therefore the flow of fluids through the system may be traced by reference to the exemplary temperature values of orange juice as the feed liquid. Accordingly, juice fed from the feed pump 12 may be delivered to conduit 14 at a temperature of 70° F. and preheated by the initial preheater 16 so as to deliver the juice to conduit 18 at a temperature of 130° F. The juice subsequently preheated by intermediate preheater 20 is delivered to conduit 22 at a temperature of 160° F., whereupon the final preheater 24 finally preheats the juice to a temperature of 200° F. in conduit 26. The preheating by the final preheater 24 is accomplished by supply thereto of steam at 212° F. The preheated juice is then converted into a vapor liquid mixture by volumetric expansion after passing through nozzle 120 into the inlet chamber 117 under a reduced static pressure. The mixture enters the tubes 116 in the initial stage evaporator having evaporating heat transfer surfaces so that further heating and evaporation takes place. The mixture is then separated by separator 32 into initially concentrated liquid and vapor reduced to a temperature of 180° F., the pump 38 withdrawing any liquid in the separator as the vaporized fluid flows to a lower pressure point in the next stage. The 180° F. vapor in conduit 34 is therefore supplied to the intermediate stage preheater 20 for raising the juice from 130° to 160° F. after which is is withdrawn under vacuum as hereinbefore indicated. The 180° F. initially concentrated juice is thereafter further evaporated by the intermediate stage evaporator and after being supplied to the nozzle 120 thereof at the 180° F. temperature which is higher than the temperature corresponding to the vacuum in stage 42 the intermediate stage separator 58 at the lower temperature of 150° F. Accordingly, the vapor leaving the separator 58 through conduit 68 at 150° F. may preheat initially the juice to raise it from 70° F. to 130° F. as hereinbefore indicated. The 150° F. further concentrated juice is then admitted to the final stage evaporator by a conduit 64 and finally separated by the separator 76 into a finally concentrated juice product at 95° F. The finally concentrated juice product therefore upon leaving the flash cooling chamber 80 is delivered by the product pump 88 at a temperature of 40° F. It will also be observed in FIGURE 1 that sight glasses 128 are provided in the intake conduits 36, 60 for the transfer pumps 38 and 62 and the intake conduits to the product delivery pump 88 for the purpose of providing visual means for inspecting the progress of the feed liquid through the system.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a multistage system for concentrating feed liquid, the combination of means supplying high temperature feed liquid under presure, evaporator means operatively connected to said liquid supplying means for receiving liquid therefrom at a high velocity and partially evaporating the liquid into a liquid and vapor mixture under suction pressure, vapor heating means operatively connected to said evaporator means for effecting said partial evaporation, separator means operatively connected to the evaporator means for receiving the liquid and vapor mixture therefrom and separating the mixture into concentrated liquid and vapor, preheater means connected to the separator means for receiving the vapor therefrom for elevating said feed liquid to said high temperature, said evaporator means comprising vertically disposed chamber means, a plurality of spaced heat transfer tubes mounted within said chamber means and extending beyond lower and upper ends of the chamber means, expansion inlet means mounted in insulated relation above the upper end of the chamber means in communication with upper ends of the tubes, insulated liquid-vapor mixture outlet means mounted below the chamber means in communication with lower end of the tubes, and nozzle means connected to said inlet means for delivering liquid thereto at said high velocity.

2. The combination of claim 1 including vapor inlet means connected to said chamber means adjacent the lower end thereof and vapor vent means connected to the chamber means adjacent the upper end thereof.

3. The combination of claim 2 wherein said expansion inlet means and liquid-vapor mixture outlet means are insulated from the chamber means by insulating spaces through which the tubes extend.

References Cited in the file of this patent

UNITED STATES PATENTS

| | | |
|---|---|---|
| 780,612 | Meyer | Jan. 24, 1905 |
| 971,258 | Dunn | Sept. 27, 1910 |
| 1,060,607 | Kestner | May 6, 1913 |
| 1,930,861 | Reich | Oct. 17, 1933 |
| 1,986,334 | Gearing | Jan. 1, 1935 |
| 2,330,221 | Kermer | Sept. 28, 1943 |
| 2,459,302 | Aronson | Jan. 18, 1949 |